United States Patent [19]
Rosin et al.

[11] Patent Number: 4,654,234
[45] Date of Patent: Mar. 31, 1987

[54] POLYURETHANE FOAM FOR CLEANING AND GERMICIDAL APPLICATIONS

[75] Inventors: Michael L. Rosin, Madison; Feagin A. Wing, Jr., Farmington, both of Conn.

[73] Assignee: Olin Corporation, Cheshire, Conn.

[21] Appl. No.: 846,182

[22] Filed: Mar. 31, 1986

[51] Int. Cl.$^4$ .............................................. B05D 3/02
[52] U.S. Cl. .................................. 427/393.5; 428/212; 428/218; 428/308.4; 428/313.5; 428/318.6; 428/318.8
[58] Field of Search ...................... 427/393.5; 428/212, 428/218, 308.4, 313.5, 318.6, 318.8

[56] References Cited

U.S. PATENT DOCUMENTS

| | | | |
|---|---|---|---|
| 3,401,128 | 9/1968 | Terry | 260/2.5 |
| 3,653,859 | 4/1972 | Zimmer et al. | 51/401 |
| 3,861,993 | 1/1975 | Guthrie | 161/159 |
| 4,082,703 | 4/1978 | Duffy et al. | 260/2.5 |
| 4,111,666 | 9/1978 | Kalbow | 51/295 |

FOREIGN PATENT DOCUMENTS 1227124 4/1971 United Kingdom .

Primary Examiner—Maurice J. Welsh
Attorney, Agent, or Firm—James B. Haglind; Thomas P. O'Day

[57] ABSTRACT

A flexible non-reticulated foam pad having on a surface thereof a polyurethane coating consisting essentially of a cured isocyanate-terminated prepolymer, the penetration of the prepolymer coating being no more than about 50 percent of the thickness of the flexible urethane foam. The coated surface provides an abrasive area which enhances its use in cleaning applications as well as increasing the resistance to tear propagation of the wet foam. In addition, the major portion of the foam pad is available for the release of cleaning and sanitizing agents or the absorption of liquids such as water. The novel foam pads are suitable for household, institutional and industrial use.

20 Claims, No Drawings

POLYURETHANE FOAM FOR CLEANING AND GERMICIDAL APPLICATIONS

This invention relates to an improved polyurethane foam, and more particularly to a polyurethane foam for cleaning and germicidal applications and to a method of making the same.

In recent years, there has been a steady increase in the demand for household convenience products. To meet this demand, various disposable polyurethane foam cleaning products have been developed. Typically, the foam product contains a cleaning agent, and may in addition contain a germicidal agent, as well as various other ingredients. However, these foam products still present a number of deficiencies.

A hydrophilic urethane foam pad is a good carrier for cleaning agents, e.g. surfactants, disinfectants, odorants, etc. However, a thin urethane foam pad used as a cleaning device lacks adequate strength, even for disposable use.

Several different approaches have been made to improve flexible urethane foams for use in cleaning applications. In one example, as described in U.S. Pat. No. 3,653,859, issued Apr. 4, 1972 to W. F. Zimmer et al., a polyurethane foam containing an abrasive and an adhesive is laminated to a flexible reinforcing backing material using heat and pressure to accomplish the lamination.

U.S. Pat. No. 3,861,993, issued Jan. 21, 1975 to J. L. Guthrie, teaches as cleaning aids composites of reticulate foam and non-reticulate foam, each foam being produced separately and then bonded with a polyurethane adhesive.

A foamed plastic pad having protuberances on one side is formed in a method described in U.S. Pat. No. 4,111,666, issued Sept. 5, 1978 to H. Kalbow. The protuberances are then covered with a coating of an adhesive and a scouring or abrasive material.

U.S Pat. No. 3,401,128, issued Sept. 10, 1968 to S. M. Terry teaches polyurethane foam products which are prepared by forming a binding agent on the surface of shredded or comminuted foam particles. The binding agent is produced by spraying simultaneously a polyisocyanate composition and a polyol composition. The coated particles are then compressed to form a bonded block compressed foam.

Similarly, U.S. Pat. No. 4,082,703, issued Apr. 4, 1978 to R. D. Duffy et al., describes rebonded polyurethane foam which is prepared by spraying shredded foam particles with prepolymer adhesive compositions and then compressing the coated foam particles into a block of rebonded foam of the desired thickness and density.

The processes described above are multi-step processes which are costly to operate in the production of disposable foam products for cleaning applications.

High load bearing foams have been produced by impregnating polyurethane foams throughout with a cured polyurethane elastomer coating. As described in British Pat. No. 1,227,124, issued Apr. 7, 1971 to the Scott Paper Company, the foam is treated with a prepolymer coating composition in amounts which are at least equal to the weight of the foam to provide compression deflection values of from 100 percent to 6000 percent in excess of that of the untreated foam.

High load bearing foams, however, are not suitable in cleaning applications which require substantial foam resiliency and ease of release of any cleaning agents used.

Now, according to the invention, an improved polyurethane foam for cleaning applications has been discovered which is suitable for household, institutional and industrial use. A flexible non-reticulated urethane foam pad having on a surface thereof a coating consisting essentially of a cured isocyanate-terminated prepolymer, the penetration of the prepolymer coating being no more than about 50 percent of the thickness of the flexible urethane foam. The coated surface provides an abrasive area which enhances its use in cleaning applications as well as substantially increasing the resistance to tear propagation of the wet foam. In addition, the major (uncoated) portion of the foam pad is available for the release of cleaning and sanitizing agents or absorption of liquids such as water.

The isocyanate-terminated prepolymer that is utilized according to the present invention is prepared by reacting an organic polyisocyanate with a polyol using standard procedures known in the art.

Suitable polyether polyols include various polyoxyalkylene polyols and mixtures thereof. These can be prepared, according to well-known methods, by condensing an alkylene oxide, or a mixture of alkylene oxides using random or step-wise addition, with a polyhydric initiator or mixture of initiators.

Illustrative alkylene oxides include ethylene oxide, propylene oxide, butylene oxide, amylene oxide, aralkylene oxides such as styrene oxide, and the halogenated alkylene oxides such as trichlorobutylene oxide and so forth. The most preferred alkylene oxide is ethylene oxide or a mixture thereof with propylene oxide using random or step-wise oxyalkylation.

Also suitable are polyester polyols such as those produced from polycarboxylic acids such as succinic acid, adipic acid, phthalic acid and isophthalic acid.

The polyhydric initiator used in preparing the polyol reactant includes the following and mixtures thereof: (a) aliphatic diols, such as ethylene glycol, 1,3-propylene glycol, butylene glycols, butane diols, pentane diols, and the like; (b) aliphatic triols, such as glycerol, trimethylol-propane, triethylolpropane, trimethylolhexane, and the like; and (c) higher functionality alcohols, such as sorbitol, pentaerythritol, methyl glucoside, polytetramethylene glycol and the like.

A preferred group of polyhydric initiators for use in preparing the polyol reactant is one which comprises aliphatic diols and triols such as ethylene glycol, propylene glycol, dipropylene glycol, glycerol, trimethylolpropane, and the like.

In preparing the polyol, the oxyalkylation reaction is allowed to proceed until the desired molecular weight is reached, at which time the reaction is terminated and the resulting polyol is recovered.

The functionality and molecular weight of the polyol are not critical and may be selected so as to provide the polyol with the desired hydroxyl number. With respect to the polyol functionality, diols and triols will be typically employed but higher functionalities may be used if desired.

The polyol reactant used in the polyurethane prepolymer formation preferably is a polyether polyol, or a mixture of two or more such compounds.

For optimum prepolymer reaction characteristics, it has been found desirable to maintain the water content of the polyol less than about 0.1 weight percent, preferably below about 0.04 weight percent. Polyols having higher water contents may be employed although they may hinder the formation of a satisfactory prepolymer.

Suitable organic polyisocyanates which may react with the polyols to produce the isocyanate terminated prepolymer include aromatic, cycloaliphatic and aliphatic polyisocyanates. Aromatic polyisocyanates such as 4,4'-diphenylmethane diisocyanate (MDI) and isomeric mixtures with 2,4'-diphenylmethane diisocyanate and 2,2'-diphenylmethane diisocyanate, as well as polymeric MDI products derived from the reaction of phosgene with an aniline-formaldehyde condensate may be employed. Other aromatic polyisocyanates which can be used include toluene diisocyanates such as the 80:20 and the 65:35 mixtures of 2,4- and 2,6-isomers, xylene diisocyanate, 3,3'-bitoluene-4,4'diisocyanate and naphthalene-1,5-diisocyanate.

Cycloaliphatic polyisocyanates which can be employed as reactants include methylene bis(4-cyclohexyl-)isocyanate and isophorone diisocyanate.

Aliphatic polyisocyanates which can be used in the prepolymer products include ethylene diisocyanate, propylene diisocyanate, and hexamethylene diisocyanate.

Preferred as the isocyanate reactants are aromatic polyisocyanates such as MDI and polymeric MDI products.

To form the prepolymer compositions used in the present invention, the polyol and isocyanate constituents can be mixed together in a reaction vessel at either room or elevated temperatures, and with or without a catalyst. Suitably, for example, when elevated temperatures are employed, the isocyanate constituent can be charged to the reaction vessel and heated; and the polyol may then be thereafter fed at a rate to maintain the desired reaction temperature.

After all the constituents are completely mixed, the reaction is allowed to proceed until the generation of prepolymer is complete, as is evidenced by the stabilized viscosity or free isocyanate (NCO) content characteristics. At room temperatures, the reaction time may vary from about 3 days when no catalyst is employed to about 1 day when a catalyst is employed. At elevated reaction temperatures, e.g. 80° C., the prepolymer generation reaction will typically be complete in less than about 5 hours when no catalyst is present. As will be appreciated, elevated temperatures should be employed when the polyol or diisocyanate constituent is normally solid at ambient temperatures. Also, when ambient or room temperatures are used, it is necessary to utilize intimate or vigorous mixing, such as can be achieved by conventional mixing apparatus providing high shear.

In carrying out the reaction, an equivalent NCO/OH ratio from about 1.2/1 to about 20/1, and preferably from about 2/1 to about 10/1 is employed.

Suitable catalysts which may be employed include catalytic amounts of any of the many known catalysts for catalyzing isocyanate-polyol reactions such as organotin compounds such as dialkyltin salts of carboxylic acids, e.g.—dibutyltin diacetate, dibutyltin dilaurate, dibutyltin maleate, dilauryltin diacetate, diocyltin diacetate, and the like. Stannous octoate and the like and tertiary amines such as triethylene diamine which may be purchased, as a ready-to-use composition, under the trademark Dabco 33-LV, are further suitable representative examples.

To the isocyanate-terminated prepolymer compositions an agent may be added to prevent foaming when applied as a coating and during the curing of the coating of the flexible polyurethane foam. Suitable anti-foaming or defoaming agents which may be used include any known compositions which substantially prevent foaming and include, for example, silicone fluids such as those produced by General Electric under the tradename GE-SF or by Dow Corning as Dow Corning Antifoam A. Effective amounts of the antifoaming agent include those in the range of from about 0.001 to about 1.0, and preferably from about 0.01 to about 0.1 percent by weight. Other additives which may be admixed with the isocyanate-terminated prepolymer composition include dyes, pigments, rheological aids, and fragrances.

The isocyanate-terminated prepolymer, which is fluid before cure, is readily applied to the flexible non-reticulate urethane foams to be coated by any of the conventional coating means. The prepolymer is applied to the surface of the flexible foam in amounts which provide the desired reinforcement and the desired surface texture without impregnating a substantial portion of the foam structure with the prepolymer coating agent.

The surface coating of isocyanate-terminated prepolymer may be applied to non-reticulated polyurethane foams having a density, prior to coating, which is sufficient to prevent undesirably high degrees of penetration. For example, flexible polyurethane foams having a density greater than about 0.03 grams per cubic centimeter are quite suitable. While there is no upper density limit, where the coated foam pad is used in cleaning and sanitizing applications, low density or medium density non-reticulated foams are preferred.

Regardless of the density of the non-reticulated polyurethane foam, the penetration of the prepolymer coating applied should be no more than about 50 percent of the thickness of the flexible urethane foam.

Preferably the penetration is from about 5 to about 35 percent of the thickness, and more preferably from about 10 to about 25 percent of the thickness. The degree of penetration can be determined by any suitable method including microscopic examination or photomicrographic methods.

Following the application of the isocyanate-terminated prepolymer to the flexible urethane foams, the coating is cured by any of a variety of methods well known to those skilled in the art including, for example, moisture, heating, by catalysis, etc. or any combination of these methods.

The prepolymeric coatings are preferably moisture-cured by exposure to atmospheres having a high relative humidity or steam at temperatures in the range of from about 80° C. to about 110° C. At temperatures below 100° C., suitable relative humidities are those above about 60 percent. The coatings are cured rapidly, for example, at a cure rate of 1 minute or less, and in the absence of a catalyst.

Upon curing, a discontinuous coating becomes integrally bonded to the foam by penetration and interlocking with the porous surface structure of the foam and by reaction with chemical groups in the foam. The discontinuous coating thus develops strong cohesiveness and at the same time has excellent adhesion to the foam even when wet, while permitting the uniform passage of liquids.

The novel process of the present invention may be applied to any flexible urethane foam to provide coated polyurethane foams having the enhanced surface effects and improved strength properties.

When foamed pads are to be used in general cleaning applications, the isocyanate-terminated prepolymer coating may be applied to both upper and lower surfaces of the foam to provide a foam pad which resists curling when wet, while readily allowing the release of water or cleaning agents.

In a preferred embodiment, flexible urethane foams having cleaning and/or germicidal agents incorporated therein are coated on at least one side to produce disposable cleaning pads suitable for cleaning and scrubbing in household, institutional, and industrial applications. As the prepolymer coating is applied primarily to the surface or surfaces of the foam, more desirable are flexible foams having the cleaning and germicidal agents incorporated into the cellular structure of the foam.

A particularly preferred embodiment is a polyurethane foam of the type described in U.S. Pat. No. 4,476,251, issued Oct. 9, 1984 to A. D. Cianciolo et al, the entire disclosure of which is incorporated by reference herein. Polyurethane foams having cleaning and germicidal activities are produced from a reaction mixture which includes a select hydrophilic prepolymer, water, a nonionic cleaning surfactant, such as an alkylphenol ethylene oxide condensate or an aliphatic polyoxyethylene ether alcohol, and a quaternary ammonium germicidal agent including n-alkyl ($C_{12}$–$C_{18}$)dimethyl benzyl ammonium chlorides, n-alkyl ($C_{12}$–$C_{18}$)dimethyl ethyl benzyl ammonium chlorides and mixtures thereof. In addition, the reaction mixture may include other ingredients, if desired, which serve a certain function or impart certain properties to the foam. This includes, for example, pigments, dyes, fragrances, flame retardant additives, fibers, fillers and so forth.

Polyurethane foams produced by the process of U.S. Pat. No. 4,476,251, avoid subsequent impregnation methods, as the desired active ingredients are incorporated directly into the reaction mixture prior to foam formation. Activity levels are effectively controlled, and the active ingredients are distributed substantially uniformly throughout the resulting cellular structure. In addition, a fine cell structure is achieved, which leads to a desirable metered release of the active ingredients during the use of the polyurethane foam product.

The following examples are provided to illustrate the invention. All parts are by weight unless otherwise specified.

EXAMPLE 1

An isocyanate-terminated prepolymer was prepared by charging 852 g of molten diphenylmethane diisocyanate (MDI)(Isonate® 125M, the Upjohn Company) to a clean dry reactor equipped with a mechanical stirrer, heating mantle and temperature controller, addition funnel, and gas inlet through which a nitrogen blanket was maintained during the entire procedure. The molten isocyanate was heated to 70° C. and 1148 g of dry polyether diol Poly-G® 55-112 (a 1000 MW ethylene oxide adduct produced by the Olin Corporation) was added at a constant rate over a period of 45 minutes. The polyol had first been dried by heating to 110° C. for 2 hours under 0.2 mm Hg vacuum with agitation. Upon completion of the addition of the polyol, the temperature was raised to 75°–80° C. and maintained for 3 hours to ensure complete reaction. An isocyanate-terminated prepolymer was produced containing 9.5 percent free NCO and having a viscosity of 10,100 cps at 23° C.

EXAMPLE 2

An isocyanate-terminated prepolymer was prepared by charging 725 g of molten diphenylmethane diisocyanate (Isonate® 125M, the Upjohn Company) to the clean dry reactor of EXAMPLE 1. The molten isocyanate was heated to 70° C. and 1275 g of dry polyether diol Poly-G® 55-56 (2000 MW ethylene oxide adduct produced by the Olin Corporation) was added at a constant rate over a period of 45 minutes. The polyol had previously been dried by heating to 110° C. for 2 hours under 0.2 mm Hg vacuum with vigorous agitation. Upon completion of the addition of the polyol, the temperature was raised to 75°–80° C. and maintained for 3 hours to ensure complete reaction. An isocyanate-terminated prepolymer was produced containing 9.5 percent free NCO and having a viscosity of 3670 cps at 23° C.

EXAMPLE 3

An isocyanate-terminated prepolymer was prepared by charging 602 g of molten diphenylmethane diisocyanate (Isonate® 125M, the Upjohn Company) to a clean dry reactor of the type used in EXAMPLE 1. The molten isocyanate was heated to 70° C. and 500 g of dry polyether diol Poly-G® 55-173 (a 650 MW ethylene oxide adduct produced by the Olin Corporation) was added at a constant rate over a period of 45 minutes. The polyol was dried by heating to 100° C. for 2 hours under 0.2 mm Hg vacuum with vigorous agitation. Upon completion of the addition of the polyol, the temperature was raised to 75°–80° C. and maintained for 3 hours to ensure complete reaction. The isocyanate-terminated prepolymer produced contained 12.5 percent free NCO and had a viscosity of 8,100 cps at 25° C.

EXAMPLE 4

The isocyanate-terminated prepolymer prepared in EXAMPLE 2 was thoroughly mixed with 0.1 percent by weight of dibutyltin dilaurate as catalyst. The prepolymer was then applied as a coating to an 8"×10"×⅛" thick piece of non-reticulated polyurethane foam by spreading the prepolymer on a uniformly smooth flat surface to a predetermined uniform depth and then laying the foam on the wet coating. The thickness and weight of the coating transferred to the foam, and the degree of penetration of the coating was varied by changing the depth of the wet coating on the flat surface and the amount of pressure used to contact the foam with the wet surface. In this manner pieces of foam were coated having from about 5 g per square foot to 22 g per square foot of coating. The coatings were cured by placing the coated foams in an oven set at 120° C. for 2 minutes. Upon curing these coatings gave a significant improvement in strength properties to coated foams compared to the original foam base as well as providing an improved surface for scrubbing.

EXAMPLE 5

The coating prepared in EXAMPLE 2 was applied to non-reticulated polyurethane foam strips 10"×36"×⅛" using a two-roll bench top laminator (Talboys Model 2100) equipped with a coating trough and doctor blade. The linear feed rate of the foam was 3 feet per minute through a 0.050 inch gap between the rolls. Control of the amount of coating carried to the foam by the applicator roll was provided by adjusting the gap between the applicator roll and the doctor blade. Coating weights of 10 to 25 g per square foot were applied. After curing by the method of example 4, these coatings gave significant reinforcement to the foam strips as well as forming an improved surzzzzface for scrubbing.

EXAMPLE 6

The coating was prepared using the method of EXAMPLE 2. Without the addition of a catalyst, the coating was applied to the non-reticulated polyurethane foam using the method of EXAMPLE 4. Cure of the coating was effected by suspending the coated foam for one minute above a hot water bath whose temperature was 98° C. After curing the coated foam was tack free with no evidence of blocking.

EXAMPLE 7

A reactor of the type of EXAMPLE 1 was charged with 2072.4 g of molten MDI (Isonate ® 125M, the Upjohn Company) while a nitrogen blanket was maintained. The MDI was heated to 65° C., 1650 g of a polyethyleneglycol 600 MW (Aldrich) containing 0.1 percent by weight of silicone fluid SF-1080 (General Electric) as an antifoam agent, was added at a constant rate over 72 minutes while the nitrogen blanket was maintained. The reaction temperature was maintained at 60° to 76° C. during the addition and then at 70° to 75° C. for 2 more hours. Heating was then stopped, and the reaction mixture was stirred overnight. The viscosity of the above prepolymer, which contains 12.5 weight percent of NCO, was 8500 cps (23° C.).

EXAMPLE 8

To a reactor of the type of EXAMPLE 1 was charged 399.4 g of molten MDI (Isonate ® 125M, the Upjohn Company). Also charged to the reactor were 263 g of a 3:1 molar mixture of polyethylene glycol (MW 600) and trimethylol propane (TMI) which had been dried to a final water content of 0.019 percent and containing 0.1 percent by weight of Antifoam A (Dow Corning). During the charging of the reactions a nitrogen blanket was maintained. The reaction temperature was maintained at 61° to 82° C. during the addition and then at 72° to 85° C. for 90 minutes. Heating was then stopped, and the reaction mixture was stirred overnight. The viscosity of the above prepolymer, which contains 12.5 weight percent NCO, was 55,000 cps (26.5° C.).

EXAMPLE 9

To 250 g of the prepolymer prepared by the method of EXAMPLE 3 (viscosity 11,500 cps) was added 33.55 g of molten MDI. The mixture was then thoroughly heated in a water bath to completely dissolve the added MDI. The viscosity of the resulting 15 percent NCO prepolymer was 3800 cps.

EXAMPLE 10

To 250 g of a prepolymer prepared by the method of EXAMPLE 7, which had previously been used for coating foam and had been left standing all day, was added 33.58 g of molten MDI. The mixture was then thoroughly heated in a water bath to completely dissolve the added MDI. The viscosity of the resulting 15 percent NCO prepolymer was 4400 cps.

EXAMPLE 11

A polyurethane flexible non-reticulated foam ($4' \times 1' \times \frac{1}{8}''$) having a wet foam tear resistance of 0.4 lb per inch was coated with 12 grams per square foot of a coating prepared by the method of EXAMPLE 9. The coated foam was left in a high humidity room (40° C. and 80 percent humidity) overnight. Upon removal the coating was totally tack free. The wet tear resistance of a section of the coated foam was 4.0 lbs per inch.

EXAMPLE 12

The method of EXAMPLE 9 was repeated with a prepolymer coating prepared by the method of EXAMPLE 7. The prepolymer (2.4 g) was applied to a piece of foam ($4' \times 1' \times \frac{1}{8}''$) to provide 12 grams per square foot of coating. The coated foam was placed in a high humidity room (40° C. and 80 percent humidity) for several hours. Upon removal the coating was totally tack free and the wet tear resistance was measured to be 2.35 lbs per inch.

EXAMPLE 13

A section of foam, 4 mm in thickness, prepared by the method of EXAMPLE 6, was examined under a microscope. The coating was found to have penetrated from about 10 to 15 percent of the thickness of the foam. A photomicrograph of the foam section (magnification 7.5×) showed the penetration of the coating to be about 0.5 mm.

What is claimed is:

1. A flexible non-reticulated urethane foam pad having on a surface thereof a polyurethane coating consisting essentially of a cured isocyanate-terminated prepolymer, the penetration of the prepolymer coating being no more than about 50 percent of the thickness of the flexible urethane foam.

2. The flexible non-reticulated urethane foam pad of claim 1 having a density, prior to coating, of at least 0.03 grams per cubic centimeter.

3. The flexible non-reticulated urethane foam pad of claim 1 having an anti-foaming agent incorporated in said prepolymer coating.

4. The flexible non-reticulated urethane foam pad of claim 1 having a cleaning agent incorporated therein.

5. The flexible non-reticulated urethane foam pad of claim 1 having a germicidal agent incorporated therein.

6. The flexible non-reticulated urethane foam pad of claim 5 in which said germicidal is a quaternary ammonium compound.

7. The flexible non-reticulated urethane foam pad of claim 4 in which said cleaning agent is a nonionic surfactant.

8. A method of producing an improved flexible non-reticulated urethane foam pad which comprises applying to a surface of the flexible non-reticulated urethane foam pad a coating of an isocyanate-terminated prepolymer, and curing the coating, the penetration of the coating being no more than about 50 percent of the thickness of the flexible non-reticulated urethane foam.

9. The method of claim 8 in which an anti-foaming agent is admixed with said coating prior to its application to the flexible non-reticulated foam pad.

10. The method of claim 8 in which a curing catalyst is admixed with said coating prior to its application to the flexible non-reticulated foam pad.

11. The method of claim 8 in which the isocyanate-terminated prepolymer is produced by reacting a polyisocyanate selected from the group consisting of aromatic polyisocyanates, cycloaliphatic polyisocyanates and aliphatic polyisocyanates, with a polyol.

12. The method of claim 11 in which the reaction is conducted at temperatures in the range of from about ambient to about 80° C.

13. The method of claim 12 in which the polyisocyanate is an aromatic polyisocyanate.

14. The method of claim 13 in which the polyol is a polyether polyol.

15. The method of claim 8 in which the flexible non-reticulated urethane foam pad has a density, prior to coating, of at least about 0.03 grams per cubic centimeter.

16. The method of claim 14 in which the polyether polyol is an adduct of an alkylene oxide with a polyhydric initiator selected from the group consisting of an aliphatic diol, an aliphatic triol and mixtures thereof.

17. The method of claim 16 in which the alkylene oxide is selected from the group consisting of ethylene oxide, propylene oxide and mixtures thereof.

18. The method of claim 11 in which the aromatic polyisocyanate is selected from the group consisting of MDI, polymeric MDI and toluene diisocyanate.

19. The method of claim 8 in which the coating of isocyanate-terminated prepolymer is cured by moisture at a temperature in the range of from about 80° C. to about 110° C.

20. The flexible non-reticulated urethane foam pad of claim 1 wherein said coating is discontinuous.

* * * * *